United States Patent
Awoniyi-Oteri et al.

(10) Patent No.: US 12,323,837 B2
(45) Date of Patent: Jun. 3, 2025

(54) SYSTEMS AND METHODS FOR USING A MASTER CELL GROUP (MCG) TO SCHEDULE RESOURCES FOR A REFERENCE SIGNAL TRANSMISSION AND MEASUREMMENT USING A SECONDARY CELL GROUP (SCG)

(71) Applicant: QUALCOMM Incorporated, San Diego, CA (US)

(72) Inventors: Olufunmilola Omolade Awoniyi-Oteri, San Diego, CA (US); Wooseok Nam, San Diego, CA (US); Tao Luo, San Diego, CA (US); Peng Cheng, Beijing (CN); Peter Pui Lok Ang, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/759,215

(22) PCT Filed: Feb. 14, 2020

(86) PCT No.: PCT/CN2020/075163
§ 371 (c)(1),
(2) Date: Jul. 21, 2022

(87) PCT Pub. No.: WO2021/159422
PCT Pub. Date: Aug. 19, 2021

(65) Prior Publication Data
US 2023/0050787 A1     Feb. 16, 2023

(51) Int. Cl.
*H04W 24/10*     (2009.01)
*H04L 5/00*     (2006.01)
(Continued)

(52) U.S. Cl.
CPC ............ *H04W 24/10* (2013.01); *H04L 5/0051* (2013.01); *H04W 72/23* (2023.01); *H04W 76/15* (2018.02)

(58) Field of Classification Search
CPC ..... H04W 24/10; H04W 76/15; H04W 72/23; H04W 52/0235; H04W 52/0206;
(Continued)

(56) References Cited

U.S. PATENT DOCUMENTS

2015/0173120 A1    6/2015   Yamada
2015/0271713 A1    9/2015   Kim et al.
(Continued)

FOREIGN PATENT DOCUMENTS

CN     106063328 A     10/2016
CN     106162729 A     11/2016
(Continued)

OTHER PUBLICATIONS

Huawei (Rapporteur): "Introduction of NB-Iot", 3GPP TSG-RAN WG2 Meeting#93, 3GPP Draft; 36300_CR0844_(REL-13)_R2-161604, 36.300 Introduction-Of NB-IOTJ 3rd Generation Partnership Project (3GPP), Mobile Competence Centre ; 650J Route Des Lucioles ; F-06921 Sophia-Antipolis Cede, vol. RAN WG2, No. St Julian's, Malta; Feb. 15, 2016-Feb. 19, 2016, Feb. 19, 2016 (Feb. 19, 2016), 278 Pages, XP051066037, Retrieved from the Internet: URL:http://www.3gpp.org/ftp/tsg_ran/WG2_RL2/TSGR2_93/Docs/ [retrieved on Feb. 19, 2016], pp. 39-52, pp. 132-151.
(Continued)

*Primary Examiner* — Rushil P. Sampat
(74) *Attorney, Agent, or Firm* — Arun Swain

(57) ABSTRACT

This disclosure provides systems, methods and apparatus for aperiodic measurement configurations. In one aspect, delaying transitioning of a secondary cell group (SCG) to an active state until a next synchronization signal block (SSB)
(Continued)

or periodic reference signal may result in an excessive delay in obtaining network resources of the SCG. Some aspects described herein enable a base station (BS) to transmit signaling using a master cell group (MCG) cell to schedule resources for an aperiodic reference signal transmission and measurement using the SCG. For example, the BS may transmit signaling to a user equipment (UE) to identify a reference signal resource for an aperiodic reference signal transmission and measurement. In this case, the BS may transmit the aperiodic reference signal using an SCG cell, and the UE may measure the aperiodic reference signal and provide a report identifying the measurement of the aperiodic reference signal.

30 Claims, 7 Drawing Sheets

(51) Int. Cl.
*H04W 72/23* (2023.01)
*H04W 76/15* (2018.01)
(58) Field of Classification Search
CPC ......... H04W 52/0229; H04W 52/0274; H04W 76/20; H04W 76/27; H04W 72/20; H04L 5/0051; H04L 5/0098; Y02D 30/70
See application file for complete search history.

(56) References Cited

U.S. PATENT DOCUMENTS

| | | | |
|---|---|---|---|
| 2020/0169922 A1 | 5/2020 | Ozturk | |
| 2020/0313833 A1* | 10/2020 | Yi | H04L 5/001 |
| 2021/0392651 A1* | 12/2021 | Futaki | H04L 5/0098 |
| 2022/0117029 A1* | 4/2022 | Takada | H04W 76/28 |
| 2022/0159483 A1* | 5/2022 | Lee | H04W 24/04 |
| 2022/0264466 A1* | 8/2022 | Ai | H04L 5/0098 |

FOREIGN PATENT DOCUMENTS

| | | |
|---|---|---|
| CN | 109391986 A | 2/2019 |
| CN | 109691169 A | 4/2019 |
| CN | 110300455 A | 10/2019 |
| CN | 110536387 A | 12/2019 |
| CN | 110651492 A | 1/2020 |
| WO | WO-2018030841 A1 | 2/2018 |
| WO | WO 2021/087949 A1 * | 5/2021 |
| WO | WO 2020/084879 A1 * | 9/2021 |

OTHER PUBLICATIONS

International Search Report and Written Opinion—PCT/CN2020/075163—ISA/EPO—Nov. 20, 2020.
Supplementary European Search Report—EP20918663—Search Authority—Berlin—Oct. 2, 2023.

* cited by examiner

SYSTEMS AND METHODS FOR USING A MASTER CELL GROUP (MCG) TO SCHEDULE RESOURCES FOR A REFERENCE SIGNAL TRANSMISSION AND MEASUREMMENT USING A SECONDARY CELL GROUP (SCG)

CROSS-REFERENCE TO RELATED APPLICATION

This Patent Application is a 371 National Phase of Patent Cooperation Treaty (PCT) Patent Application No. PCT/CN2020/075163, filed on Feb. 14, 2020, entitled "APERIODIC MEASUREMENT CONFIGURATION," and assigned to the assignee hereof. The disclosure of the prior Application is considered part of and is incorporated by reference into this Patent Application.

TECHNICAL FIELD

Aspects of the present disclosure relate generally to wireless communication, and more particularly to techniques for aperiodic measurement configuration.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a apparatus of a user equipment (UE). The method may include receiving, from a cell of a master cell group (MCG), a downlink control channel identifying a reference signal resource associated with at least one cell of a secondary cell group (SCG). The method may include performing, with the at least one cell of the SCG and in connection with an SCG transition out of a dormant state, a reference signal measurement procedure for a reference signal using the reference signal resource identified in the downlink control channel based on receiving the downlink control channel.

In some aspects, the reference signal is at least one of an aperiodic channel state information reference signal, a tracking reference signal, or a sounding reference signal. In some aspects, the cell of the MCG is a primary cell. In some aspects, the at least one cell of the SCG includes at least one of a primary secondary cell or a secondary cell. In some aspects, the cell of the MCG is a secondary cell. In some aspects, performing the reference signal measurement procedure includes performing a measurement of the reference signal from a primary secondary cell of the SCG, where the reference signal from the primary secondary cell of the SCG triggers another reference signal from at least one secondary cell of the SCG, and performing another measurement of another reference signal from the at least one secondary cell of the SCG based on performing the measurement of the reference signal from the primary secondary cell of the SCG.

In some aspects, one or more cells of the MCG are associated with a first radio access technology and one or more cells of the SCG are associated with a second radio access technology. In some aspects, one or more cells of the MCG are associated with a first numerology and one or more cells of the SCG are associated with a second numerology. In some aspects, receiving the downlink control channel includes receiving a downlink control information including information identifying the reference signal resource. In some aspects, the downlink control information is at least one of a single connectivity type of downlink control information, or a dedicated dual-connectivity type of downlink control information. In some aspects, receiving the downlink control channel includes receiving a multi-radio access technology dual-connectivity layer 1 signaling including information to end the dormant state of the SCG. In some aspects, receiving the downlink control channel includes receiving a multi-radio access technology dual-connectivity medium access control activation signal including information to end a deactivation of the SCG.

In some aspects, method includes transmitting a measurement report to identify a result of performing a measurement of the reference signal. In some aspects, transmitting the measurement report includes transmitting the measurement report based on a type of the reference signal being a channel state information reference signal type. In some aspects, transmitting the measurement report includes transmitting the measurement report using one of: the cell of the MCG, the at least one cell of the SCG, or a single cell of the at least one cell of the SCG. In some aspects, performing the reference signal measurement procedure includes receiving the reference signal using the reference signal resource. In some aspects, performing the reference signal measurement procedure includes transmitting the reference signal using the reference signal resource.

Another innovative aspect of the subject matter described in this disclosure can be implemented in a UE for wireless communication. The UE may include a memory and one or more processors operatively coupled to the memory. The memory and the one or more processors may be configured to receive, from a cell of an MCG, a downlink control channel identifying a reference signal resource associated with at least one cell of an SCG. The memory and the one or more processors may be configured to perform, with the at least one cell of the SCG and in connection with an SCG transition out of a dormant state, a reference signal measurement procedure for a reference signal using the reference signal resource identified in the downlink control channel based on receiving the downlink control channel. In some aspects, the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a cell of an MCG, a downlink control channel identifying a reference signal resource associated with at least one cell of an SCG; and perform, with the at least one cell of the SCG and in connection with an SCG transition out of a dormant state, a reference signal measurement procedure for a reference signal using the reference signal resource identified in the downlink control channel based on receiving the downlink control channel. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for means for receiving, from a cell of an MCG, a downlink control channel identifying a reference signal resource associated with at least one cell of an SCG; and means for performing, with the at least one cell of the SCG and in connection with an SCG transition out of a dormant state, a reference signal measurement procedure for a reference signal using the reference signal resource identified in the downlink control channel based on receiving the downlink control channel. In some aspects, the apparatus may perform or implement any one or more of the aspects described in connection with the method, above or elsewhere herein.

One innovative aspect of the subject matter described in this disclosure can be implemented in a method of wireless communication performed by a apparatus of a base station (BS). The method may include transmitting, using a cell of an MCG, a downlink control channel identifying a reference signal resource associated with at least one cell of an SCG. The method may include performing, with the at least one cell of the SCG and in connection with an SCG transition out of a dormant state, a reference signal measurement procedure for a reference signal using the reference signal resource identified in the downlink control channel based on transmitting the downlink control channel.

In some aspects, the reference signal is at least one of an aperiodic channel state information reference signal, a tracking reference signal, or a sounding reference signal. In some aspects, the cell of the MCG is a primary cell.

In some aspects, the at least one cell of the SCG includes at least one of a primary secondary cell or a secondary cell. In some aspects, the cell of the MCG is a secondary cell. In some aspects, performing the reference signal measurement procedure includes transmitting the reference signal using a primary secondary cell of the SCG, where the reference signal transmitted using the primary secondary cell of the SCG triggers another reference signal for transmission using at least one secondary cell of the SCG, and transmitting the other reference signal using the at least one secondary cell of the SCG based on transmitting the reference signal using the primary secondary cell of the SCG.

In some aspects, one or more cells of the MCG are associated with a first radio access technology and one or more cells of the SCG are associated with a second radio access technology. In some aspects, one or more cells of the MCG are associated with a first numerology and one or more cells of the SCG are associated with a second numerology. In some aspects, transmitting the downlink control channel includes transmitting a downlink control information including information identifying the reference signal resource. In some aspects, the downlink control information is at least one of: a single connectivity type of downlink control information, or a dedicated dual-connectivity type of downlink control information. In some aspects, transmitting the downlink control channel includes transmitting a multi-radio access technology dual-connectivity layer 1 signaling including information to end the dormant state of the SCG.

In some aspects, transmitting the downlink control channel includes transmitting a multi-radio access technology dual-connectivity medium access control activation signaling including information to end a deactivation of the SCG. In some aspects, the method includes receiving a measurement report identifying a result of a measurement of the reference signal. In some aspects, receiving the measurement report includes receiving the measurement report based on a type of the reference signal being a channel state information reference signal type. In some aspects, receiving the measurement report includes receiving the measurement report on one of: the cell of the MCG, the at least one cell of the SCG, or a single cell of the at least one cell of the SCG. In some aspects, performing the reference signal measurement procedure includes receiving the reference signal using the reference signal resource. In some aspects, performing the reference signal measurement procedure includes transmitting the reference signal using the reference signal resource.

Another innovative aspect of the subject matter described in this disclosure can be implemented in a BS for wireless communication. The BS may include a memory and one or more processors operatively coupled to the memory. The memory and the one or more processors may be configured to transmit, using a cell of an MCG, a downlink control channel identifying a reference signal resource associated with at least one cell of an SCG. The memory and the one or more processors may be configured to perform, with the at least one cell of the SCG and in connection with an SCG transition out of a dormant state, a reference signal measurement procedure for a reference signal using the reference signal resource identified in the downlink control channel based on transmitting the downlink control channel. In some aspects, the BS may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to transmit, using a cell of an MCG, a downlink control channel identifying a reference signal resource associated with at least one cell of an SCG; and perform, with the at least one cell of the SCG and in connection with an SCG transition out of a dormant state, a reference signal measurement procedure for a reference signal using the reference signal resource identified in the downlink control channel based on transmitting the downlink control channel. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for means for transmitting, using a cell of an MCG, a downlink control channel identifying a reference signal resource associated with at least one cell of an SCG; and means for performing, with the at least one cell of the SCG and in connection with an SCG transition out of a dormant state, a reference signal measurement procedure for a reference signal using the reference signal resource identified in the downlink control channel based on transmitting the downlink control channel. In some aspects, the apparatus may perform or implement any one or more of the aspects described in connection with the method, above or elsewhere herein.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
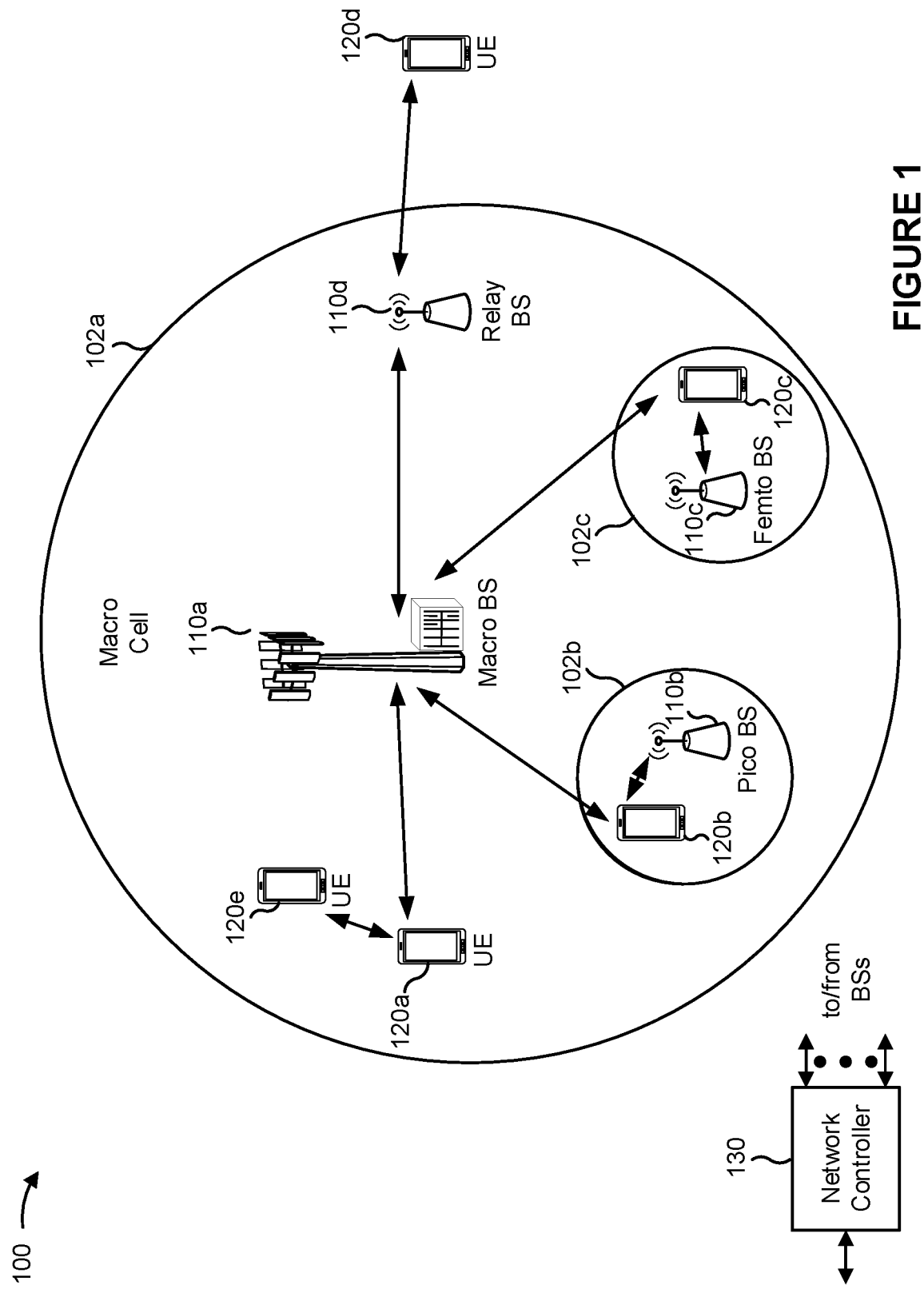
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G, 4G or 5G, or further implementations thereof, technology.

Some communication systems provide for dual connectivity. In dual connectivity, a user equipment (UE) may connect to a first node, such as a base station (BS), that is connected to a core network and that may be termed a master node (MN). Similarly, the UE may connect to a second node, such as another BS or the same BS, that is optionally connected to the core network and that may be termed a secondary node (SN). The master node may provide a first group of cells, which are collectively termed a master cell group (MCG), and the secondary node may provide a second group of cells, which are collectively termed a secondary cell group (SCG). A first cell of the MCG may be a primary cell (Pcell) and one or more second cells of the MCG may be secondary cells (Scells). Similarly, a first cell of the SCG may be a primary secondary cell (PScell) and one or more second cells of the SCG may be secondary cells (Scells or SScells).

To conserve resources, such as power resources or network resources, the second node may periodically deactivate or suspend the SCG, in which case the SCG may enter a dormant state. When network resources of the SCG are again needed, the second node may transition the SCG from the dormant state to an active state. For example, the first node may instruct the second node to transition the SCG to the active state and may transmit signaling to the UE to indicate that the SCG is transitioning to the active state. To ensure synchronization, the second node and the UE may wait for a next synchronization signal block (SSB) or periodic reference signal for the UE to perform and report tracking measurements associated with transitioning the SCG to the active state.

However, delaying transitioning the SCG to the active state until a next SSB or periodic reference signal may result in an excessive delay in obtaining network resources of the SCG. Some aspects described herein enable the first node to transmit signaling using the MCG to schedule resources for reference signal transmission and measurement using the SCG. For example, the first node may transmit a physical downlink control channel (PDCCH) using a cell of the MCG and the PDCCH may include, for example, a downlink control information (DCI) identifying a reference signal resource for an aperiodic reference signal transmission and measurement using a cell of the SCG. The UE may receive the PDCCH, identify the reference signal resource, perform a measurement of the aperiodic reference signal in the reference signal resource, and transmit reporting regarding the measurement. In some aspects, performing a measurement procedure may include the UE receiving aperiodic reference signals, such as an aperiodic channel state information reference signal (A-CSI-RS), aperiodic tracking reference signal (A-TRS), or other examples, at a resource identified in the PDCCH, performing measurements, and reporting the measurements. In some aspects, performing a measurement procedure may include the UE transmitting an aperiodic sounding reference signal (A-SRS) using the resources identified in the PDCCH.

Particular implementations of the subject matter described in this disclosure can be implemented to realize one or more of the following potential advantages. For example, using an MCG to schedule an aperiodic reference signal for measurement on an SCG may reduce a delay between triggering the SCG to transition out of a dormant state to completing the transition using tracking information determined based on a reference signal measurement. Moreover, based on reducing a delay associated with reference signal measurement, relative to waiting for an SSB or a periodic reference signal, the SCG may remain dormant for a greater period of time without negatively affecting throughput, thereby improving power savings associated with SCG dormancy.

FIG. 1 is a block diagram conceptually illustrating an example of a wireless network 100. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between the BS 110a and the UE 120d. A relay station also may be referred to as a relay BS, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

The UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband interne of things) devices. Some UEs may be considered a Customer Premises Equipment (CPE). The UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as a UE 120*a* and a UE 120*e*) may communicate directly using one or more sidelink channels (for example, without using a BS 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the BS 110.

Figure 2:
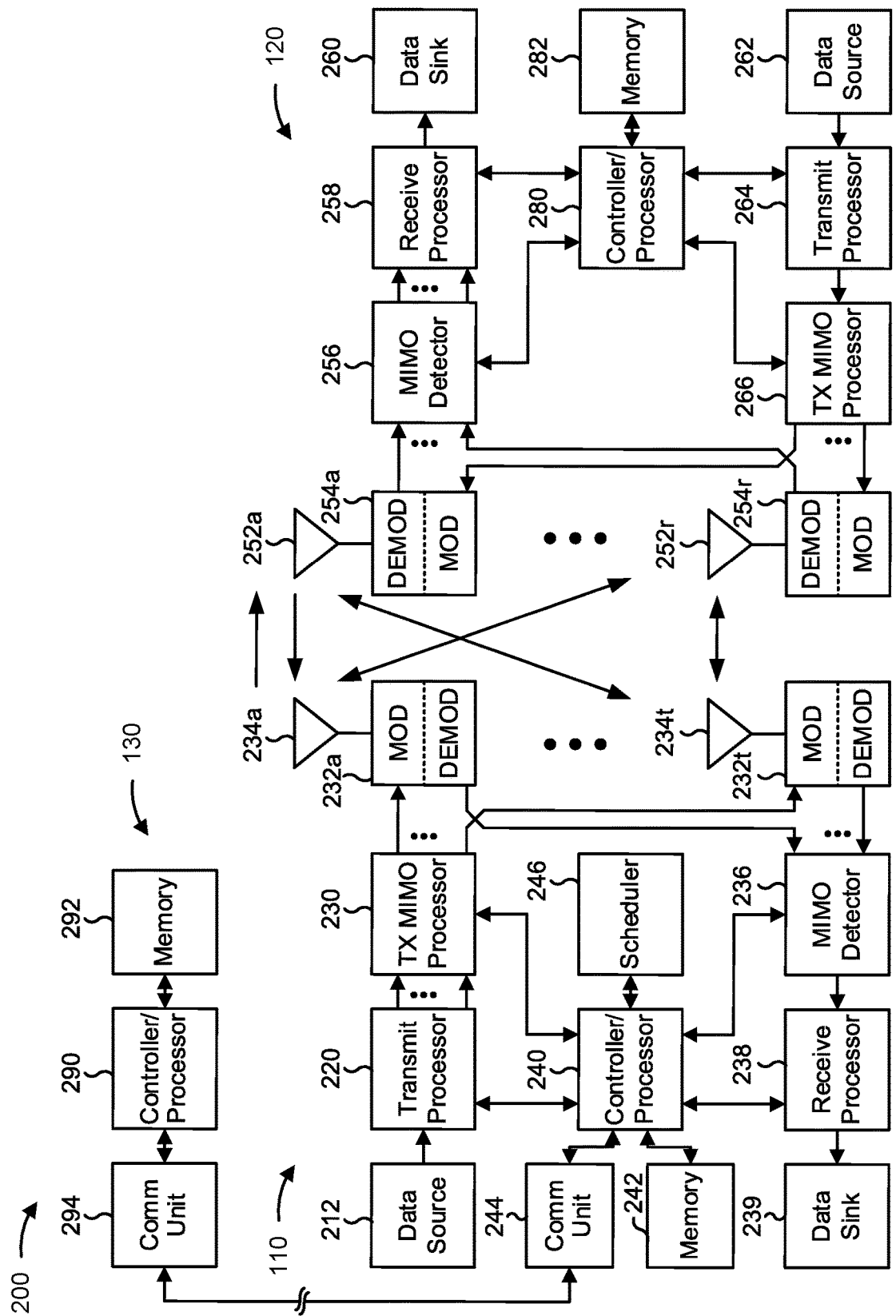
FIG. 2 is a block diagram conceptually illustrating an example of a base station (BS) in communication with a user equipment (UE) in a wireless network.

FIG. 2 is a block diagram conceptually illustrating an example 200 of a BS 110 in communication with a UE 120 in a wireless network. In some aspects, the BS 110 and the UE 120 may respectively be one of the base stations and one of the UEs in the wireless network 100 of FIG. 1. The BS 110 may be equipped with T antennas 234*a* through 234*t*, and the UE 120 may be equipped with R antennas 252*a* through 252*r*, where in general T≥1 and R≥1.

At the BS 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from the modulators 232*a* through 232*t* may be transmitted via T antennas 234*a* through 234*t*, respectively. According to various aspects described in more detail below, the synchronization signals can be generated with location encoding to convey additional information.

At the UE 120, the antennas 252*a* through 252*r* may receive the downlink signals from the BS 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from a controller/processor 280. The transmit processor 264 also may generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, etc.), and transmitted to the BS 110. At the BS 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller or processor (i.e., controller/processor) 240. The BS 110 may include a communication unit 244 and communicate to a network controller 130 via the communication unit 244. The network controller 130 may include a communication unit 294, a controller or processor (i.e., controller/processor) 290, and a memory 292.

The controller/processor 240 of the BS 110, the controller/processor 280 of UE 120, or any other component(s) of FIG. 2 may perform one or more techniques associated with aperiodic measurement configuration, as described in more detail elsewhere herein. For example, the controller/processor 240 of the BS 110, the controller/processor 280 of the UE 120, or any other component(s) (or combinations of components) of FIG. 2 may perform or direct operations of, for example, a process 400 of FIG. 4, a process 500 of FIG. 5, or other processes as described herein. The memories 242 and 282 may store data and program codes for the BS 110 and the UE 120, respectively. A scheduler 246 may schedule UEs for data transmission on the downlink, the uplink, or a combination thereof.

Figure 4:
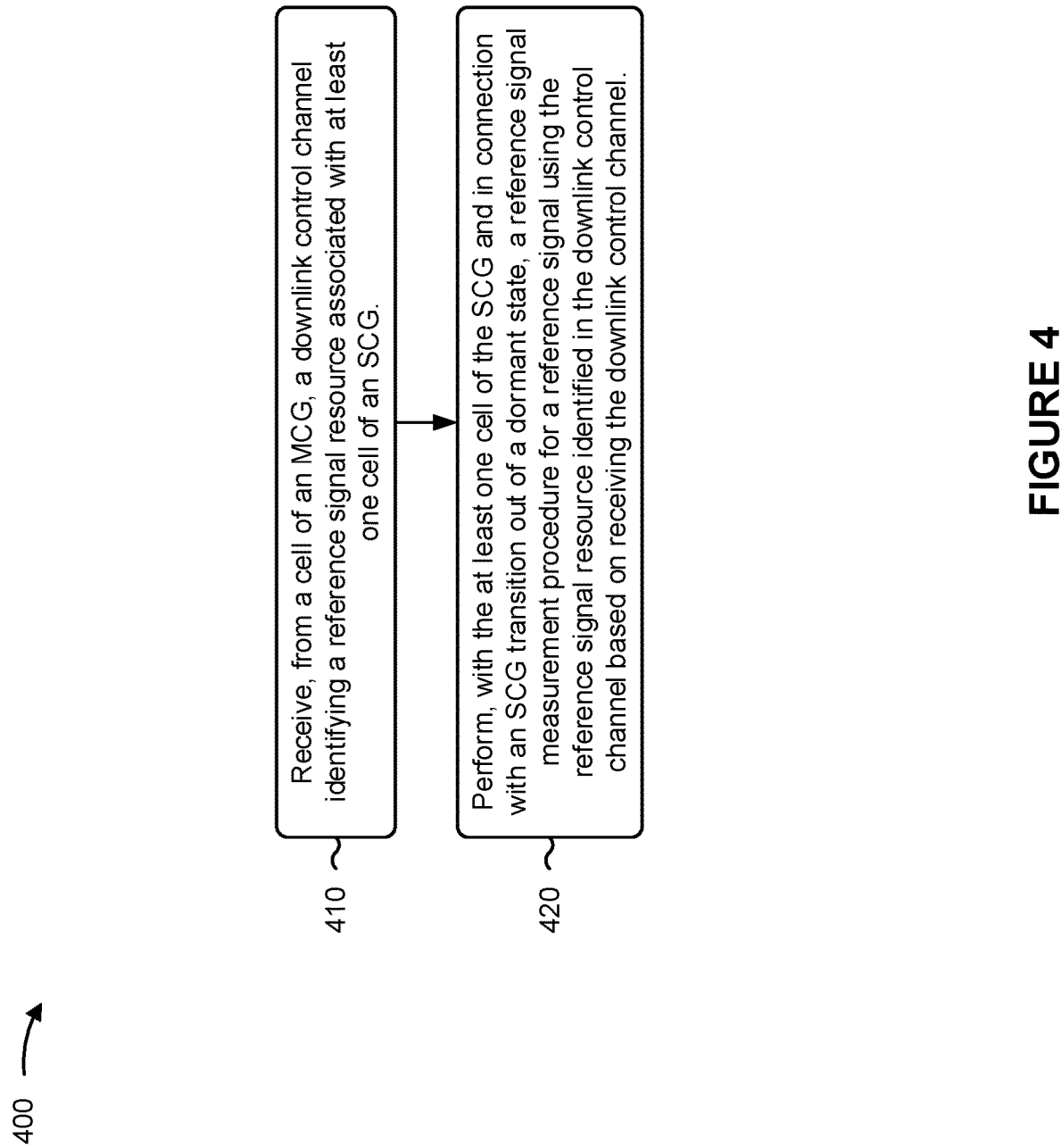
FIG. 4 is a diagram illustrating an example process performed, for example, by a UE.

The stored program codes, when executed by the controller/processor 280 or other processors and modules at the UE 120, may cause the UE 120 to perform operations described with respect to process 400 of FIG. 4, or other processes as described herein. The stored program codes, when executed by the controller/processor 240 or other processors and modules at the BS 110, may cause the BS 110 to perform operations described with respect to the process 500 of FIG. 5, or other processes as described herein. A scheduler 246 may schedule UEs for data transmission on the downlink, the uplink, or a combination thereof.

The UE 120 may include means for performing one or more operations described herein, such as the process 400 of FIG. 4 or other processes as described herein. In some aspects, such means may include one or more components of the UE 120 described in connection with FIG. 2. The BS 110 may include means for performing one or more operations described herein, such as the process 500 of FIG. 5 or other processes as described herein. In some aspects, such means may include one or more components of the BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3A:
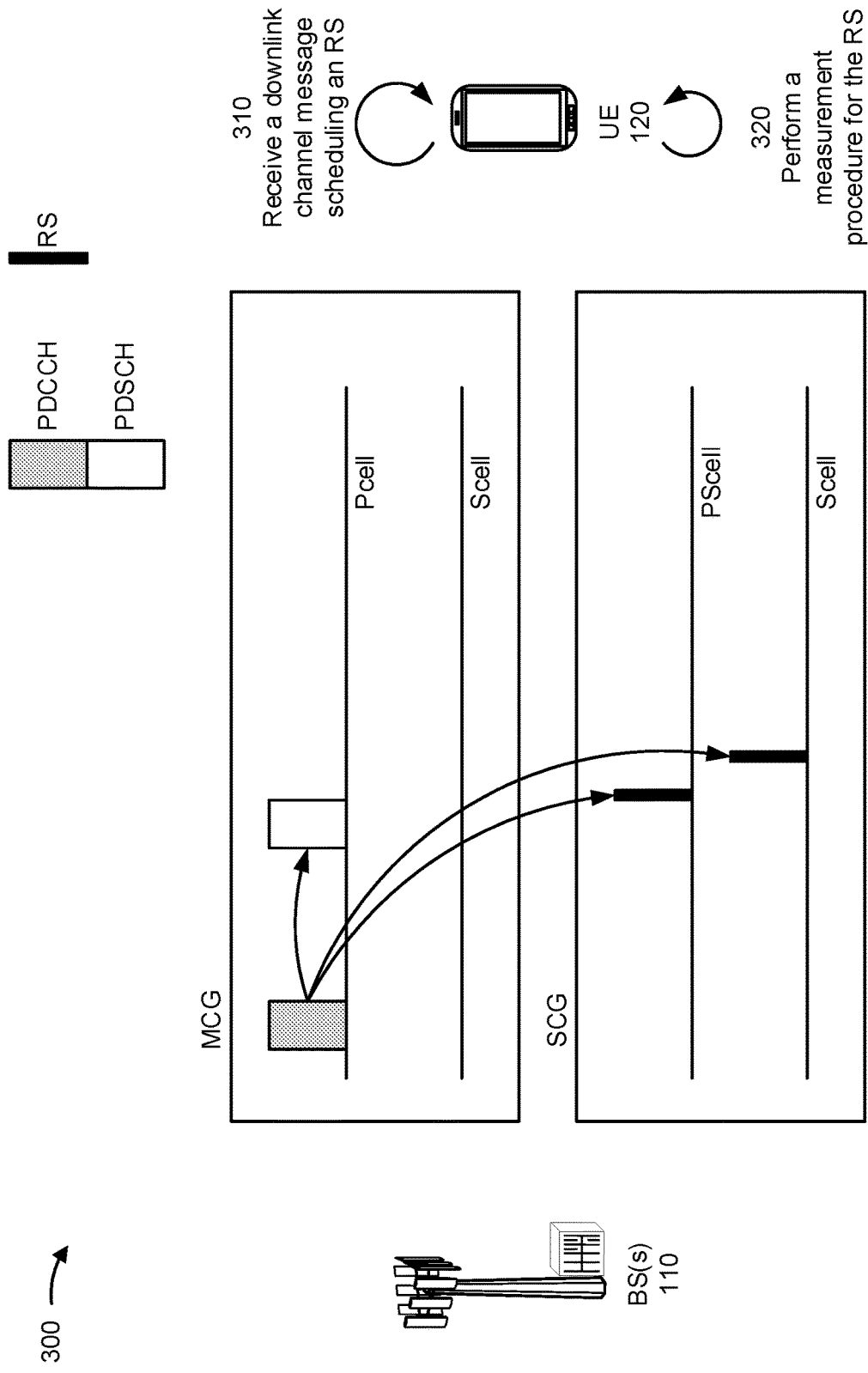
FIGS. 3A-3C are diagrams illustrating an example of aperiodic measurement configuration.
Figure 3B:
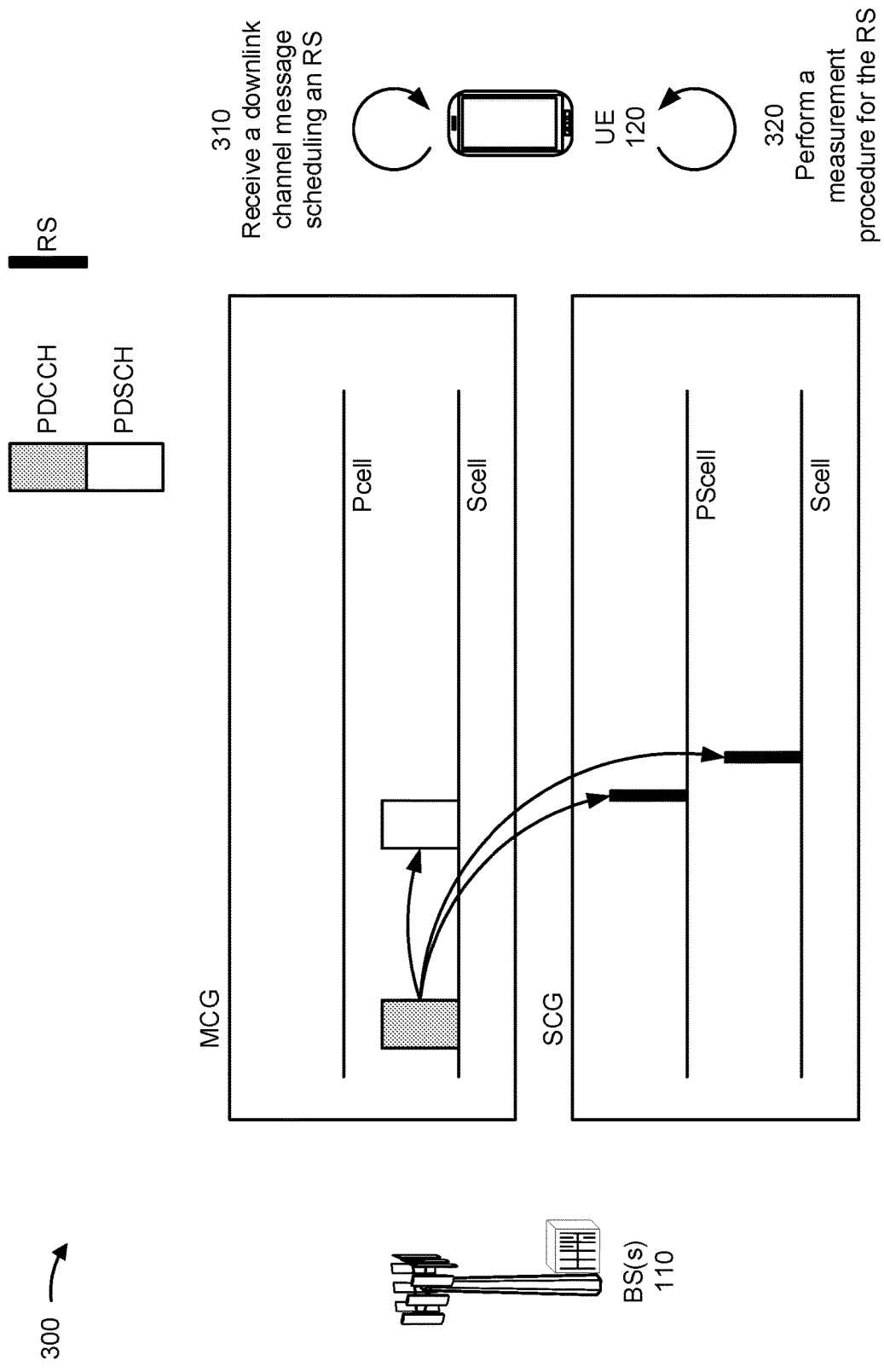
Figure 3C:
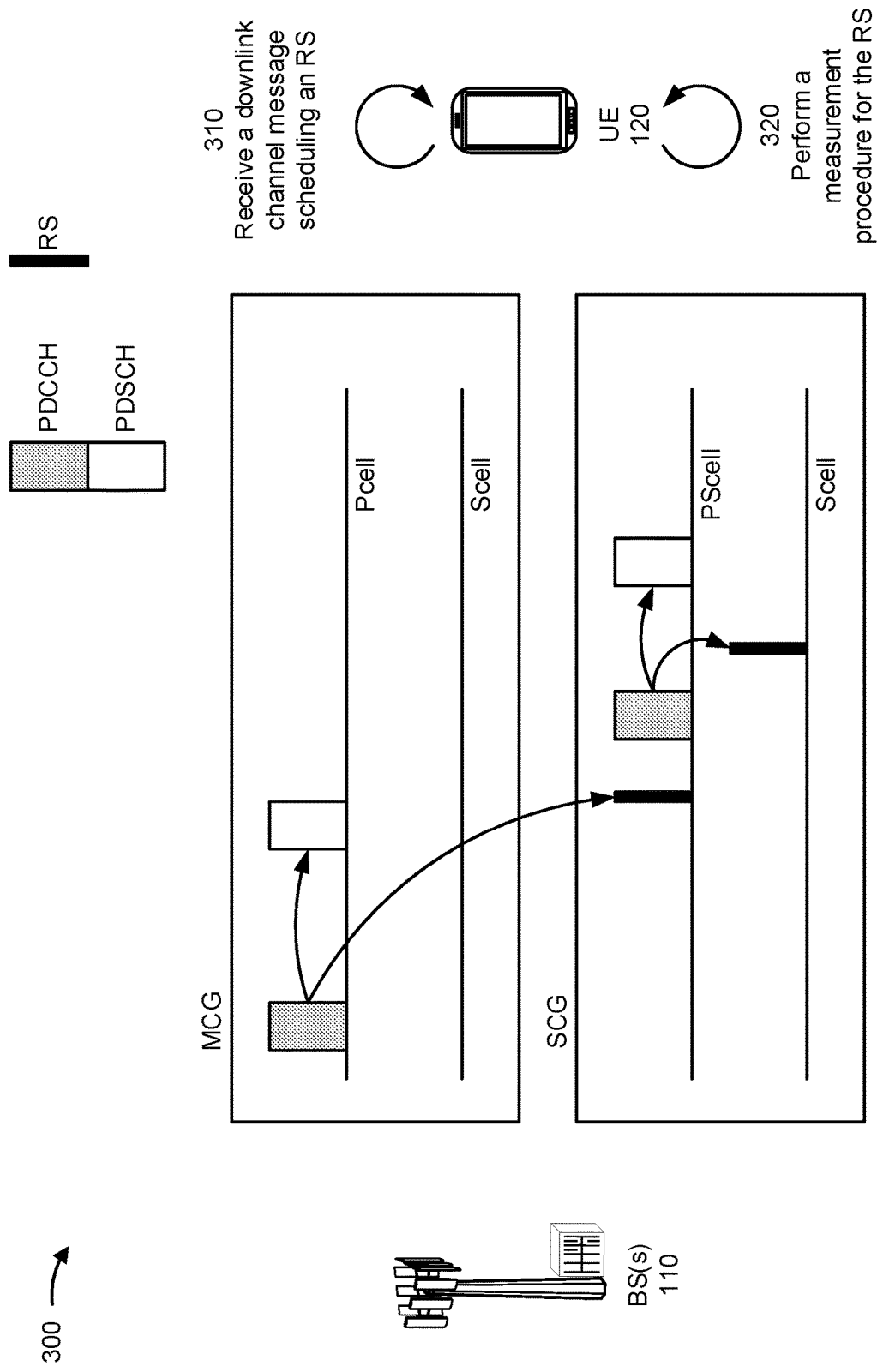

FIGS. 3A-3C are diagrams illustrating an example 300 of aperiodic measurement configuration. As shown in FIGS. 3A-3C, the example 300 includes one or more BS(s) 110 and a UE 120. In some aspects, a BS 110 may include a first node providing an MCG with a primary cell and one or more secondary cells, and a second node providing an SCG with a primary secondary cell and one or more secondary cells.

With regard to FIGS. 3A-3C, and as shown by reference number 310, the UE 120 may receive a downlink channel message scheduling a reference signal (RS). For example, the UE 120 may receive, from an MCG cell, a PDCCH scheduling a reference signal for transmission using an SCG cell. For example, as shown in FIG. 3A, the BS 110 may transmit the PDCCH using the primary cell of the MCG to schedule the reference signal using the primary secondary cell of the SCG, the secondary cell of the SCG, or a combination thereof. In contrast, as shown in FIG. 3B, the BS 110 may transmit the PDCCH using a secondary cell of the MCG to schedule the reference signal for transmission using the primary secondary cell of the SCG, the secondary cell of the SCG, or a combination thereof. In further contrast, as shown in FIG. 3C, the BS 110 may transmit a first PDCCH using the primary cell of the MCG to schedule a first reference signal for transmission using the primary secondary cell of the SCG. In this case, after transmitting the first reference signal using the primary secondary cell of the SCG, the BS 110 may transmit a second PDCCH using the primary secondary cell of the SCG to schedule a second reference signal on a secondary cell of the SCG. Additionally, or alternatively, the BS 110 may use the first reference signal transmission to convey information identifying a reference signal resource for the second reference signal transmission.

In some aspects, the BS 110 may transmit a PDCCH using a cell of the MCG, which is associated with scheduling another transmission, to schedule the reference signal for transmission using the SCG. For example, the BS 110 may transmit a PDCCH using the primary cell of the MCG, and the PDCCH may schedule a corresponding PDSCH on the primary cell of the MCG and may include information identifying a reference signal resource for a reference signal. In some aspects, the BS 110 may schedule a particular type of aperiodic reference signal for transmission using the SCG. For example, the BS 110 may transmit the PDCCH on a cell of the MCG to schedule an aperiodic channel state information reference signal (A-CSI-RS), a tracking reference signal (TRS), a sounding reference signal (SRS) (for transmission by the UE 120 using resources of the SCG), or other examples of aperiodic reference signals. In this case, BS 110 may transmit the PDCCH to cause the UE 120 to subsequently receive an A-CSI-RS or a TRS or to transmit an SRS.

In some aspects, the BS 110 may perform cross-radio access technology scheduling using the PDCCH. For example, the BS 110 may transmit the PDCCH using an MCG cell, which may be, for example, an LTE cell. In this case, the PDCCH may include information identifying a resource on an SCG cell, which may be, for example, an NR cell. Additionally, or alternatively, the BS 110 may transmit the PDCCH using a cell of the MCG with a first numerology to schedule an aperiodic reference signal using a cell of the SCG with a second numerology.

In some aspects, the BS 110 may include a DCI in the PDCCH to convey the information identifying a resource of the SCG for a measurement of an aperiodic reference signal. For example, the BS 110 may use an existing single-connectivity deployment DCI with one or more bits set to identify the resource of the cell of the SCG in which an aperiodic reference signal is to be measured. Additionally, or alternatively, the BS 110 may use a DCI defined in a specification for triggering aperiodic reference signal measurements in dual-connectivity deployments. In some aspects, the BS 110 may use a non-DCI based message to convey information triggering the aperiodic reference signal on the SCG. For example, the BS 110 may transmit a multi-RAT dual connectivity (MR-DC) layer 1 (L1) signaling message to identify reference signal resources of a cell of the SCG for a reference signal transmission. In this case, the BS 110 may transmit the MR-DC L1 signaling message to trigger the SCG to transition from a dormant state and to trigger the aperiodic reference signal (using a single message). Additionally, or alternatively, the BS 110 may transmit an MR-DC medium access control (MAC) control element (CE) to activate the SCG and to trigger the aperiodic reference signal (using a single message).

With regard to FIGS. 3A-3C, and as shown by reference number 320, the BS 110 and the UE 120 may communicate to perform a reference signal measurement procedure. For example, the UE 120 may perform a measurement of an A-CSI-RS, an aperiodic TRS (A-TRS), or another type of aperiodic reference signal that the BS 110 transmits. Additionally, or alternatively, the UE 120 may transmit, for example, an aperiodic SRS that the BS 110 may measure. In this case, the BS 110 may perform a measurement of the aperiodic SRS (A-SRS).

In some aspects, the UE 120 may report one or more measurements of one or more aperiodic reference signals on, for example, the same cell from which the UE 120 received the message triggering the one or more aperiodic reference signals. For example, when the UE 120 receives a PDCCH from the primary cell of the MCG, the UE 120 may transmit reporting of a measurement of an A-CSI-RS to the primary cell of the MCG. Additionally, or alternatively, the UE 120 may transmit the reporting on one or more cells on which the UE 120 measured one or more reference signals. For example, the UE 120 may measure a first reference signal on the primary secondary cell and a second reference signal on a secondary cell of the SCG, and may transmit a first report to the primary secondary cell and a second report to the secondary cell of the SCG. Additionally, or alternatively, the UE 120 may consolidate a plurality of reports into, for example, a single report and transmit the single report on, for example, the primary secondary cell, the second cell of the SCG, or another cell.

FIG. 4 is a diagram illustrating an example process 400 performed, for example, by a UE. The example process 400 shows where a UE, such as UE 120, performs operations associated with aperiodic measurement configuration.

In some aspects, the process 400 may include receiving, from a cell of an MCG, a downlink control channel identifying a reference signal resource associated with at least one cell of an SCG (block 410). For example, the UE (using the receive processor 258, the transmit processor 264, the controller/processor 280, the memory 282, or another component) may receive, from a cell of an MCG, a downlink control channel identifying a reference signal resource associated with at least one cell of an SCG, as described above. In some aspects, the UE may include one or more interfaces to receive the downlink control channel.

As shown in FIG. 4, in some aspects, the process 400 may include performing, with the at least one cell of the SCG and in connection with an SCG transition out of a dormant state, a reference signal measurement procedure for a reference signal using the reference signal resource identified in the downlink control channel based on receiving the downlink control channel (block 420). For example, the UE (the receive processor 258, the transmit processor 264, the controller/processor 280, the memory 282, or another component) may perform, with the at least one cell of the SCG and in connection with an SCG transition out of a dormant state, a reference signal measurement procedure for a reference signal using the reference signal resource identified in the downlink control channel based on receiving the downlink control channel, as described above. In some aspects, the UE may include one or more interfaces to perform the reference signal measurement procedure.

The process 400 may include additional aspects, such as any single aspect or any combination of aspects described below or in connection with one or more other processes described elsewhere herein.

In a first aspect, the reference signal is at least one of an aperiodic channel state information reference signal, a tracking reference signal, or a sounding reference signal.

In a second aspect, alone or in combination with the first aspect, the cell of the MCG is a primary cell.

In a third aspect, alone or in combination with one or more of the first and second aspects, the at least one cell of the SCG includes at least one of a primary secondary cell or a secondary cell.

In a fourth aspect, alone or in combination with one or more of the first through third aspects, the cell of the MCG is a secondary cell.

In a fifth aspect, alone or in combination with one or more of the first through fourth aspects, performing the reference signal measurement procedure includes performing a measurement of the reference signal from a primary secondary cell of the SCG, where the reference signal from the primary secondary cell of the SCG triggers another reference signal from at least one secondary cell of the SCG, and performing another measurement of another reference signal from the at least one secondary cell of the SCG based on performing the measurement of the reference signal from the primary secondary cell of the SCG.

In a sixth aspect, alone or in combination with one or more of the first through fifth aspects, one or more cells of the MCG are associated with a first radio access technology and one or more cells of the SCG are associated with a second radio access technology.

In a seventh aspect, alone or in combination with one or more of the first through sixth aspects, one or more cells of the MCG are associated with a first numerology and one or more cells of the SCG are associated with a second numerology.

In an eighth aspect, alone or in combination with one or more of the first through seventh aspects, receiving the downlink control channel includes receiving a downlink control information including information identifying the reference signal resource.

In a ninth aspect, alone or in combination with one or more of the first through eighth aspects, the downlink control information is at least one of a single connectivity type of downlink control information, or a dedicated dual-connectivity type of downlink control information.

In a tenth aspect, alone or in combination with one or more of the first through ninth aspects, receiving the downlink control channel includes receiving a multi-radio access technology dual-connectivity layer 1 signaling including information to end the dormant state of the SCG.

In an eleventh aspect, alone or in combination with one or more of the first through tenth aspects, receiving the downlink control channel includes receiving a multi-radio access technology dual-connectivity medium access control activation signal including information to end a deactivation of the SCG.

In a twelfth aspect, alone or in combination with one or more of the first through eleventh aspects, the process 400 includes transmitting a measurement report to identify a result of performing a measurement of the reference signal.

In a thirteenth aspect, alone or in combination with one or more of the first through twelfth aspects, transmitting the measurement report includes transmitting the measurement report based on a type of the reference signal being a channel state information reference signal type.

In a fourteenth aspect, alone or in combination with one or more of the first through thirteenth aspects, transmitting the measurement report includes transmitting the measurement report using one of: the cell of the MCG, the at least one cell of the SCG, or a single cell of the at least one cell of the SCG.

In a fifteenth aspect, alone or in combination with one or more of the first through fourteenth aspects, performing the reference signal measurement procedure includes receiving the reference signal using the reference signal resource.

In a sixteenth aspect, alone or in combination with one or more of the first through fifteenth aspects, performing the reference signal measurement procedure includes transmitting the reference signal using the reference signal resource.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

Figure 5:
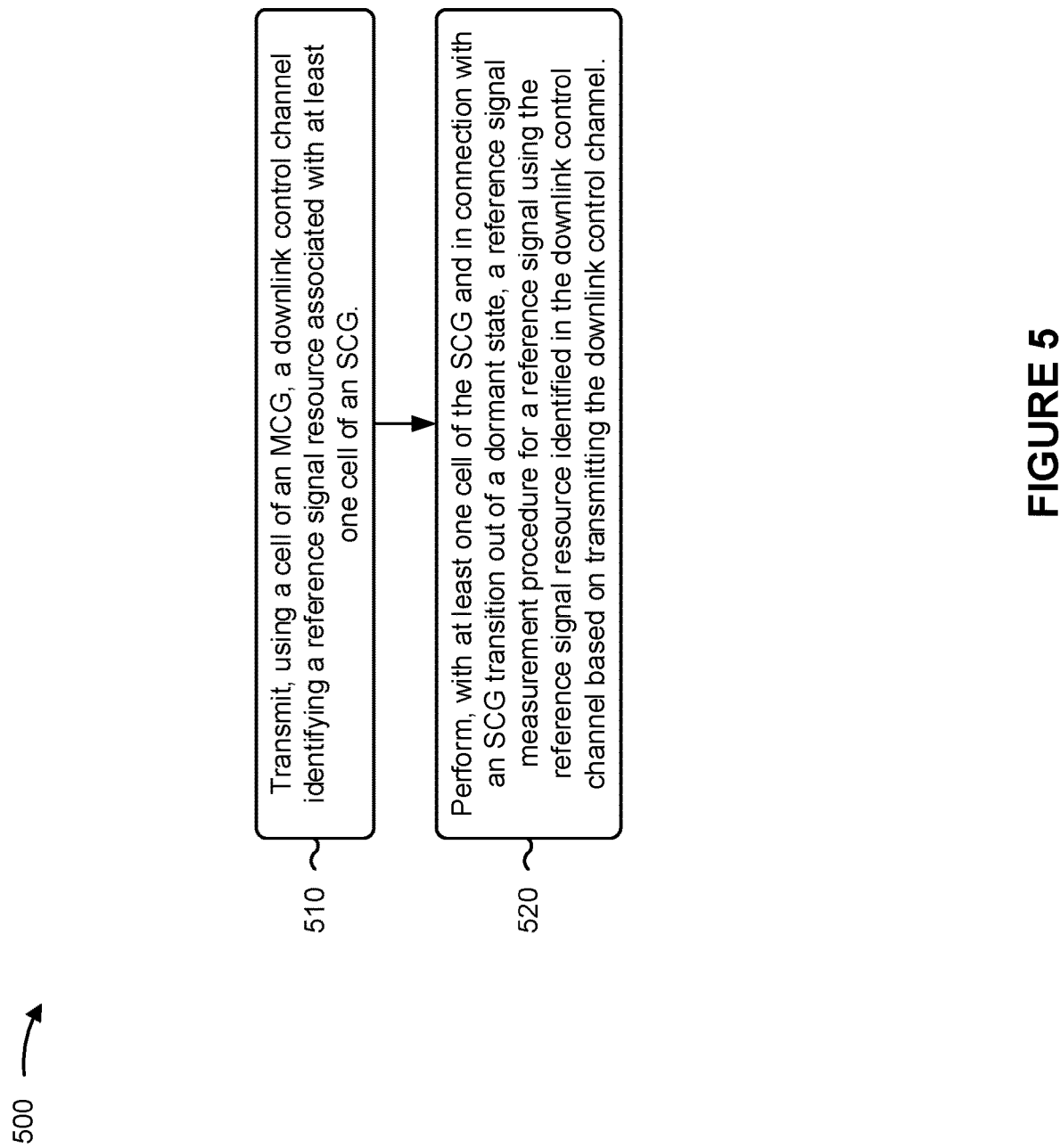
FIG. 5 is a diagram illustrating an example process performed, for example, by a BS.

FIG. 5 is a diagram illustrating an example process 500 performed, for example, by a BS. The example process 500 shows where a BS, such as BS 110, performs operations associated with aperiodic measurement configuration.

In some aspects, the process 500 may include transmitting, using a cell of an MCG, a downlink control channel identifying a reference signal resource associated with at least one cell of an SCG (block 510). For example, the BS (for example, using the transmit processor 220, the receive processor 238, the controller/processor 240, the memory 242, or another component) may transmit, using a cell of an MCG, a downlink control channel identifying a reference signal resource associated with at least one cell of an SCG, as described above. In some aspects, the BS may include one or more interfaces to transmit the downlink control channel.

In some aspects, the process 500 may include performing, with the at least one cell of the SCG and in connection with an SCG transition out of a dormant state, a reference signal measurement procedure for a reference signal using the reference signal resource identified in the downlink control channel based on transmitting the downlink control channel (block 520). For example, the BS (for example, using the transmit processor 220, the receive processor 238, the controller/processor 240, the memory 242, or another component) may perform, with the at least one cell of the SCG and in connection with an SCG transition out of a dormant state, a reference signal measurement procedure for a reference signal using the reference signal resource identified in the downlink control channel based on transmitting the downlink control channel, as described above. In some aspects, the BS may include one or more interfaces to perform the reference signal measurement procedure.

The process 500 may include additional aspects, such as any single aspect or any combination of aspects described below or in connection with one or more other processes described elsewhere herein.

In a first aspect, the reference signal is at least one of an aperiodic channel state information reference signal, a tracking reference signal, or a sounding reference signal.

In a second aspect, alone or in combination with the first aspect, the cell of the MCG is a primary cell.

In a third aspect, alone or in combination with one or more of the first and second aspects, the at least one cell of the SCG includes at least one of a primary secondary cell or a secondary cell.

In a fourth aspect, alone or in combination with one or more of the first through third aspects, the cell of the MCG is a secondary cell.

In a fifth aspect, alone or in combination with one or more of the first through fourth aspects, performing the reference signal measurement procedure includes transmitting the reference signal using a primary secondary cell of the SCG, where the reference signal transmitted using the primary secondary cell of the SCG triggers another reference signal for transmission using at least one secondary cell of the SCG, and transmitting the other reference signal using the at least one secondary cell of the SCG based on transmitting the reference signal using the primary secondary cell of the SCG.

In a sixth aspect, alone or in combination with one or more of the first through fifth aspects, one or more cells of the MCG are associated with a first radio access technology and one or more cells of the SCG are associated with a second radio access technology.

In a seventh aspect, alone or in combination with one or more of the first through sixth aspects, one or more cells of the MCG are associated with a first numerology and one or more cells of the SCG are associated with a second numerology.

In an eighth aspect, alone or in combination with one or more of the first through seventh aspects, transmitting the downlink control channel includes transmitting a downlink control information including information identifying the reference signal resource.

In a ninth aspect, alone or in combination with one or more of the first through eighth aspects, the downlink control information is at least one of: a single connectivity type of downlink control information, or a dedicated dual-connectivity type of downlink control information.

In a tenth aspect, alone or in combination with one or more of the first through ninth aspects, transmitting the downlink control channel includes transmitting a multi-radio access technology dual-connectivity layer 1 signaling including information to end the dormant state of the SCG.

In an eleventh aspect, alone or in combination with one or more of the first through tenth aspects, transmitting the downlink control channel includes transmitting a multi-radio access technology dual-connectivity medium access control activation signaling including information to end a deactivation of the SCG.

In a twelfth aspect, alone or in combination with one or more of the first through eleventh aspects, the process 500 includes receiving a measurement report identifying a result of a measurement of the reference signal.

In a thirteenth aspect, alone or in combination with one or more of the first through twelfth aspects, receiving the measurement report includes receiving the measurement report based on a type of the reference signal being a channel state information reference signal type.

In a fourteenth aspect, alone or in combination with one or more of the first through thirteenth aspects, receiving the measurement report includes receiving the measurement report on one of: the cell of the MCG, the at least one cell of the SCG, or a single cell of the at least one cell of the SCG.

In a fifteenth aspect, alone or in combination with one or more of the first through fourteenth aspects, performing the reference signal measurement procedure includes receiving the reference signal using the reference signal resource.

In a sixteenth aspect, alone or in combination with one or more of the first through fifteenth aspects, performing the reference signal measurement procedure includes transmitting the reference signal using the reference signal resource.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed at a user equipment (UE), comprising:
   receiving, from a cell of a master cell group (MCG), a downlink control channel identifying a reference signal resource associated with at least one cell of a secondary cell group (SCG); and
   performing, with the at least one cell of the SCG and in connection with an SCG transition out of a dormant state, a reference signal measurement procedure for an aperiodic reference signal using the reference signal resource identified in the downlink control channel based on receiving the downlink control channel.

2. The method of claim 1, wherein the aperiodic reference signal is
   an aperiodic channel state information reference signal.

3. The method of claim 1, wherein the cell of the MCG is a primary cell.

4. The method of claim 1, wherein the at least one cell of the SCG includes at least one of a primary secondary cell or a secondary cell.

5. The method of claim 1, wherein the cell of the MCG is a secondary cell.

6. The method of claim 1, wherein performing the reference signal measurement procedure comprises:
   performing a measurement of the aperiodic reference signal from a primary secondary cell of the SCG,
      wherein the aperiodic reference signal triggers another reference signal from at least one secondary cell of the SCG; and
   performing another measurement of the other reference signal from the at least one secondary cell of the SCG based on performing the measurement of the aperiodic reference signal from the primary secondary cell of the SCG.

7. The method of claim 1, wherein one or more cells of the MCG are associated with a first radio access technology and one or more cells of the SCG are associated with a second radio access technology.

8. The method of claim 1, wherein one or more cells of the MCG are associated with a first numerology and one or more cells of the SCG are associated with a second numerology.

9. The method of claim 1, wherein receiving the downlink control channel comprises:
   receiving a downlink control information including information identifying the reference signal resource.

10. The method of claim 9, wherein the downlink control information is at least one of:
    a single connectivity type of downlink control information, or
    a dedicated dual-connectivity type of downlink control information.

11. The method of claim 1, wherein receiving the downlink control channel comprises:
    receiving a multi-radio access technology dual-connectivity layer 1 signaling including information to end the dormant state of the SCG.

12. The method of claim 1, wherein receiving the downlink control channel comprises:
    receiving a multi-radio access technology dual-connectivity medium access control activation signaling including information to end a deactivation of the SCG.

13. The method of claim 1, further comprising:
    transmitting a measurement report to identify a result of performing a measurement of the aperiodic reference signal.

14. The method of claim 13, wherein transmitting the measurement report comprises:
    transmitting the measurement report based on a type of the aperiodic reference signal being a channel state information reference signal type.

15. The method of claim 13, wherein transmitting the measurement report comprises:
    transmitting the measurement report using one of:
       the cell of the MCG,
       the at least one cell of the SCG, or
       a single cell of the at least one cell of the SCG.

16. A method of wireless communication performed at a base station (BS), comprising:
    transmitting, using a cell of a master cell group (MCG), a downlink control channel identifying a reference signal resource associated with at least one cell of a secondary cell group (SCG); and
    performing, with the at least one cell of the SCG and in connection with an SCG transition out of a dormant state, a reference signal measurement procedure for an aperiodic reference signal using the reference signal resource identified in the downlink control channel based on transmitting the downlink control channel.

17. The method of claim 16, wherein the aperiodic reference signal is
    an aperiodic channel state information reference signal.

18. The method of claim 16, wherein the cell of the MCG is a primary cell.

19. The method of claim 16, wherein the at least one cell of the SCG includes at least one of a primary secondary cell or a secondary cell.

20. The method of claim 16, wherein the cell of the MCG is a secondary cell.

21. The method of claim 16, wherein performing the reference signal measurement procedure comprises:
    transmitting the aperiodic reference signal using a primary secondary cell of the SCG,
       wherein the aperiodic reference signal triggers another reference signal for transmission using at least one secondary cell of the SCG; and
    transmitting the other reference signal using the at least one secondary cell of the SCG based on transmitting the aperiodic reference signal using the primary secondary cell of the SCG.

22. The method of claim 16, wherein one or more cells of the MCG are associated with a first radio access technology and one or more cells of the SCG are associated with a second radio access technology.

23. The method of claim 16, wherein one or more cells of the MCG are associated with a first numerology and one or more cells of the SCG are associated with a second numerology.

24. The method of claim 16, wherein transmitting the downlink control channel comprises:
    transmitting a downlink control information including information identifying the reference signal resource.
25. The method of claim 24, wherein the downlink control information is at least one of:
    a single connectivity type of downlink control information, or
    a dedicated dual-connectivity type of downlink control information.
26. The method of claim 16, wherein transmitting the downlink control channel comprises:
    transmitting a multi-radio access technology dual-connectivity layer 1 signaling including information to end the dormant state of the SCG.
27. The method of claim 16, wherein transmitting the downlink control channel comprises:
    transmitting a multi-radio access technology dual-connectivity medium access control activation signaling including information to end a deactivation of the SCG.
28. The method of claim 16, further comprising:
    receiving a measurement report identifying a result of a measurement of the aperiodic reference signal.
29. The method of claim 28, wherein receiving the measurement report comprises:
    receiving the measurement report based on a type of the aperiodic reference signal being a channel state information reference signal type.
30. The method of claim 28, wherein receiving the measurement report comprises:
    receiving the measurement report on one of:
        the cell of the MCG,
        the at least one cell of the SCG, or
        a single cell of the at least one cell of the SCG.

* * * * *